US012709095B2

(12) United States Patent
Minami et al.

(10) Patent No.: US 12,709,095 B2
(45) Date of Patent: Aug. 18, 2026

(54) HEAD BOARD, LIQUID DISCHARGE HEAD, AND LIQUID DISCHARGE APPARATUS

(71) Applicant: CANON KABUSHIKI KAISHA, Tokyo (JP)

(72) Inventors: Seiko Minami, Saitama (JP); Nobuyuki Hirayama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 172 days.

(21) Appl. No.: 18/406,386

(22) Filed: Jan. 8, 2024

(65) Prior Publication Data

US 2024/0227394 A1 Jul. 11, 2024

(30) Foreign Application Priority Data

Jan. 10, 2023 (JP) ................................ 2023-001910

(51) Int. Cl.

| | |
|---|---|
| ***B41J 2/125*** | (2006.01) |
| ***B41J 2/045*** | (2006.01) |
| *B41J 2/14* | (2006.01) |

(52) U.S. Cl.

CPC ........... *B41J 2/125* (2013.01); *B41J 2/04541* (2013.01); *B41J 2/04551* (2013.01); *B41J 2/04563* (2013.01); *B41J 2/04573* (2013.01); *B41J 2/14153* (2013.01); *B41J 2002/14354* (2013.01)

(58) Field of Classification Search

CPC .... B41J 2/125; B41J 2/04541; B41J 2/04551; B41J 2/04563; B41J 2/04573; B41J 2/14153; B41J 2002/14354

See application file for complete search history.

(56) References Cited

U.S. PATENT DOCUMENTS

| | | | | |
|---|---|---|---|---|
| RE44,825 | E | 4/2014 | Imanaka et al. | |
| 9,272,508 | B2 * | 3/2016 | Umeda ................ | B41J 2/04543 |

FOREIGN PATENT DOCUMENTS

| | | | |
|---|---|---|---|
| JP | 7-68761 | A | 3/1995 |

* cited by examiner

*Primary Examiner* — Geoffrey S Mruk

(74) *Attorney, Agent, or Firm* — Venable LLP

(57) ABSTRACT

A head board includes at least one orifice configured to discharge a liquid, a plurality of electrothermal transducers configured to generate heat to discharge the liquid from the orifice, a sensor element configured to detect a state of discharge of the liquid from the orifice, and a delay circuit configured to delay an output timing of a signal. The plurality of electrothermal transducers and the sensor element are driven by a common drive signal, when driving the plurality of electrothermal transducers, the drive signal is input to the plurality of electrothermal transducers via the delay circuit, and when driving the sensor element, the drive signal is input to the sensor element without passing through the delay circuit.

11 Claims, 10 Drawing Sheets

HEAD BOARD, LIQUID DISCHARGE HEAD, AND LIQUID DISCHARGE APPARATUS

BACKGROUND OF THE INVENTION

Field of the Invention

The present invention mainly relates to a head board.

Description of the Related Art

Some of printing apparatuses represented by an inkjet printer or liquid discharge apparatuses include a plurality of electrothermal transducers to discharge a liquid such as ink from a plurality of orifices (see Japanese Patent Laid-Open No. 7-68761).

When driving individual electrothermal transducers, a relatively large current can be supplied, and this may cause a variation of a power supply voltage. According to Japanese Patent Laid-Open No. 7-68761, drive signals for driving the plurality of electrothermal transducers are generated such that the drive start timings thereof are different from each other, and this can reduce or suppress the variation of the power supply voltage. On the other hand, since it can be considered that the drive signal is used for another application purpose, there is room for improvement of the conventional configuration in terms of diversification of drive control of the liquid discharge apparatus.

SUMMARY OF THE INVENTION

The present invention provides a technique advantageous in diversifying drive control of a liquid discharge apparatus.

One of the aspects of the present invention provides a head board, comprising an orifice configured to discharge a liquid, a plurality of electrothermal transducers configured to generate heat to discharge the liquid from the orifice, a sensor element configured to detect a state of discharge of the liquid from the orifice, and a delay circuit configured to delay an output timing of a signal, wherein the plurality of electrothermal transducers and the sensor element are driven by a common drive signal, when driving the plurality of electrothermal transducers, the drive signal is input to the plurality of electrothermal transducers via the delay circuit, and when driving the sensor element, the drive signal is input to the sensor element without passing through the delay circuit.

Further features of the present invention will become apparent from the following description of exemplary embodiments (with reference to the attached drawings).

DESCRIPTION OF THE EMBODIMENTS

Figure 1:
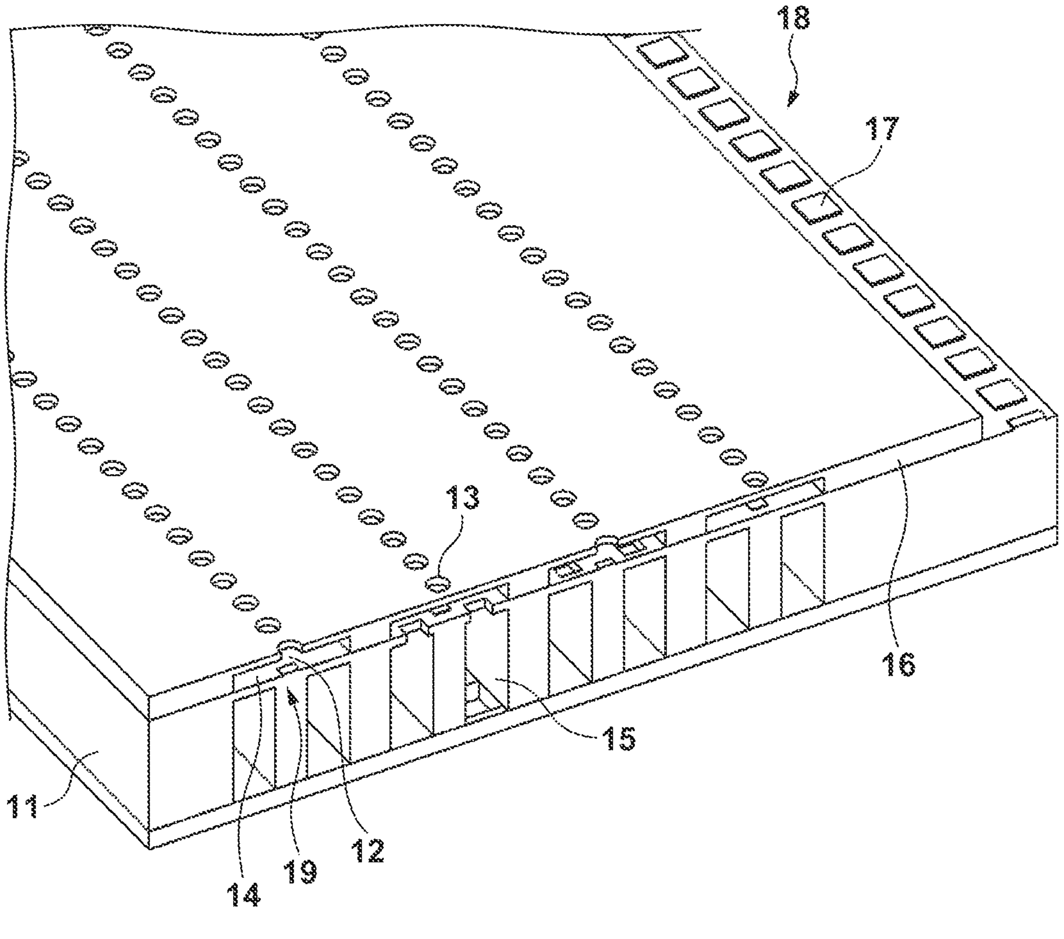
FIG. 1 is a perspective view showing an example of a head board mounted on a liquid discharge head.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Figure 12:
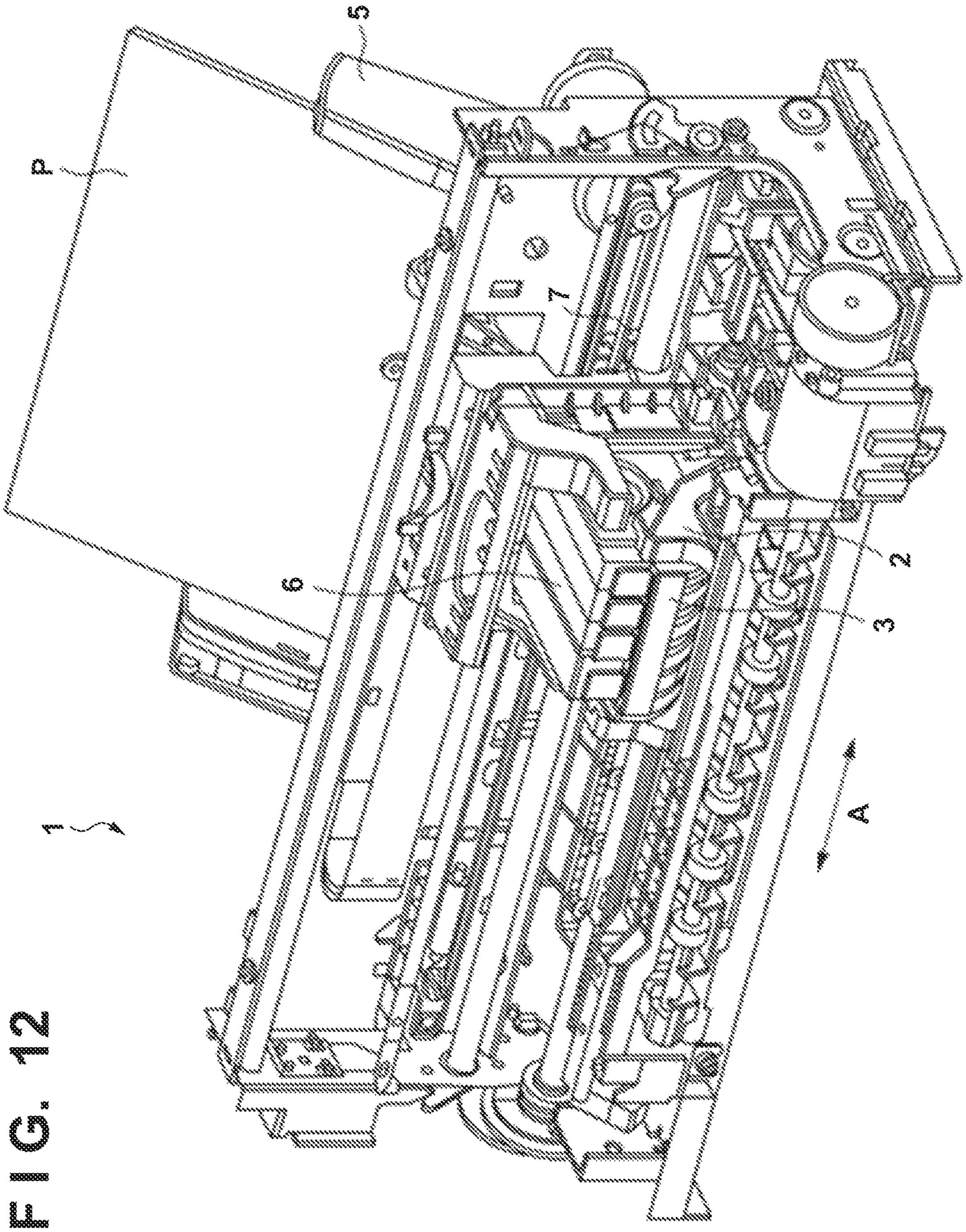
FIG. 12 is a perspective view showing an example of the outer appearance of a liquid discharge apparatus.

FIG. 12 is a perspective view showing an example of the outer appearance of a liquid discharge apparatus 1. The liquid discharge apparatus 1 can be configured to discharge a liquid such as ink to a predetermined print medium P, thereby implementing desired printing. The liquid discharge apparatus 1 includes a carriage 2 on which a liquid discharge head 3 can be mounted. The print medium P is loaded by a paper feed mechanism 5 into the apparatus main body and conveyed to a printing position by the liquid discharge head 3. If the carriage 2 moves reciprocally in the direction of an arrow A, the liquid discharge head 3 performs printing on the print medium P being conveyed while performing scanning. The liquid discharge apparatus 1 can also be expressed as a printing apparatus, and the liquid discharge head 3 can also be expressed as a printhead.

On the carriage 2, a plurality of cartridges 6 that store liquids of types different from each other are detachably mounted, and the liquids can be supplied to the liquid discharge head 3. For example, if the liquid discharge apparatus 1 is a printing apparatus supporting color printing, the plurality of cartridges 6 can store yellow (Y), magenta (M), cyan (C), and black (K) inks.

The liquid discharge head 3 is provided with a plurality of orifices configured to discharge the liquid. When the liquid is foamed by heating in the liquid discharge head 3, the liquid can be discharged individually from the plurality of orifices. In such inkjet printing, typically, an electrothermal transducer capable of implementing heating of a liquid can be used as a liquid discharge element.

Note that in this example, the liquid discharge head 3 is a serial head that can scan in a direction crossing the conveyance direction of the print medium P as the carriage 2 reciprocally moves. As another example, the liquid discharge head 3 may be a line head.

Figure 2:
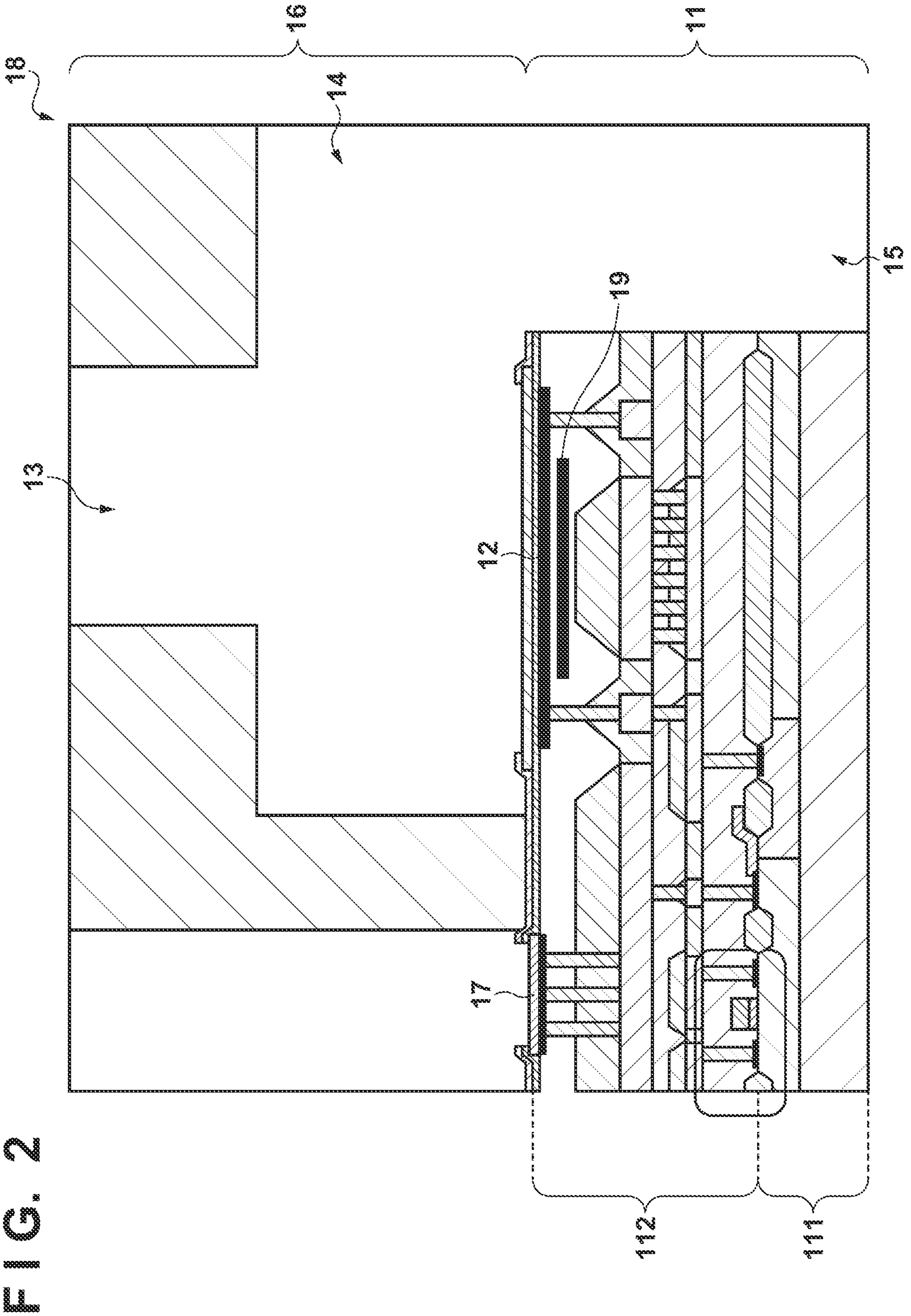
FIG. 2 is a schematic sectional view showing an example of a sectional structure for a part of the head board.

FIG. 1 is a perspective view showing a part of a head board 18 mounted on the liquid discharge head 3. FIG. 2 is a schematic sectional view showing a sectional structure for a part of the head board 18. The head board 18 can be formed by arranging, on a circuit board 11, a nozzle board 16 in which liquid orifices 13 and storage chambers 14 are formed.

The circuit board 11 is formed by forming a plurality of elements on a semiconductor substrate 111 made of a known semiconductor material such as silicon and arranging a wiring structure 112 configured to electrically connect these. All elements can be formed using a known semiconductor manufacturing technique, and examples of the elements are a resistance element, a capacitance element, and a rectifying element in addition to a switch element such as a MOS transistor.

The wiring structure 112 is formed by alternately stacking an insulating layer and a metal layer such that electrical connection or isolation between the elements is implemented in a desired mode. For the insulating layer, an insulating material such as silicon oxide or silicon nitride can be used. The concept of the metal layer includes not only a wire (wiring pattern) but also a via or contact plug extending through the insulating layer to electrically connect the wires.

Some of the elements are arranged in the wiring structure 112, and examples are an electrothermal transducer 12 and a sensor element 19. The electrothermal transducer 12 is arranged close to the orifice 13 of the nozzle board 16, and the sensor element 19 is arranged close to the electrothermal transducer 12.

The circuit board 11 (the semiconductor substrate 111 and the wiring structure 112) may be expressed as an element board or the like. Also, a through hole communicating with the storage chamber 14 of the nozzle board 16 is provided as a liquid support port 15 in the circuit board 11.

The nozzle board 16 is provided with the storage chamber (liquid storage chamber) 14 that stores the liquid supplied via the liquid support port 15, and the orifice (liquid orifice) 13 configured to discharge the liquid in the storage chamber 14. If the electrothermal transducer 12 is driven, and heat is generated, the liquid in the storage chamber 14 is foamed based on thermal energy and discharged from the orifice 13.

Note that as will be described later in detail, the heat (temperature change) at this time can be detected by the sensor element 19.

A part (typically an end portion or an edge portion) of the circuit board 11 is exposed without being covered with the nozzle board 16, and electrode pads 17 can be arrayed on the exposed portion. The electrode pad 17 is an external connection electrode for implementing drive control of the circuit board 11, and, for example, voltage supply to the circuit board 11, signal transmission/reception between the circuit board 11 and an external device, and the like can be done with the electrode pads 17.

The remaining elements in the head board 18 need only be configured in a known mode, although a detailed description will be omitted here. For example, a protective film configured to prevent corrosion caused by the liquid in the storage chamber 14 and/or reduce damage associated with foaming of the liquid can be provided between the circuit board 11 and the nozzle board 16.

Figure 3:
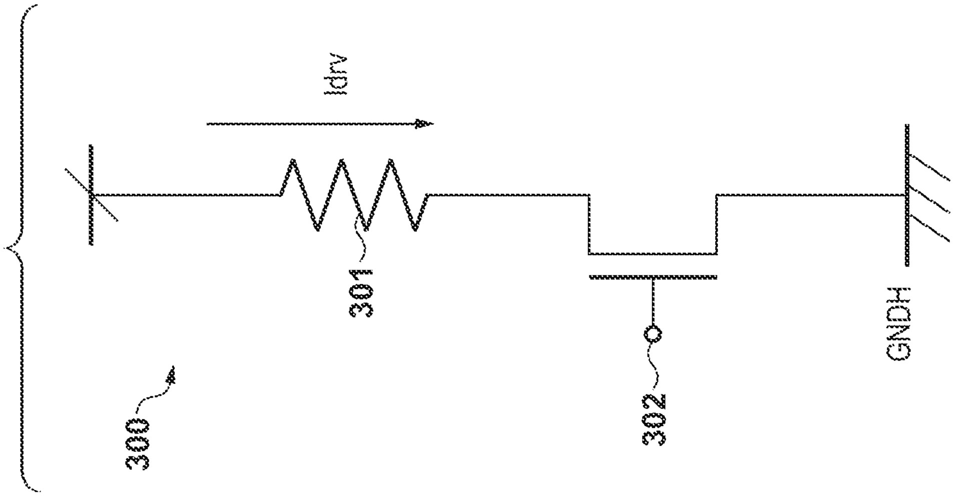
FIG. 3 is a view showing an example of a circuit configuration including an electrothermal transducer and a switch element.

FIG. 3 shows the configuration of an element 300 including an electrothermal transducer 301 (an example of the electrothermal transducer 12) and a switch element 302 for driving it. The electrothermal transducer 301 and the switch element 302 are connected in series to form a current path between a power supply voltage VH and a ground voltage GNDH. The switch element 302 turns into a conductive state to energize and drive the electrothermal transducer 301, and turns into a nonconductive state to suppress the drive. The electrothermal transducer 301 converts a current Idrv that flows to it when driven into heat.

It suffices that a known resistance element is used as the electrothermal transducer 301, and it is made of a material having a relatively high electrical resistance value. The electrothermal transducer 301 can also be expressed as a heating resistance element, a heater element, or simply a heater. As the switch element 302, for example, a high voltage transistor such as a Double-Diffused MOS (DMOS) transistor can be used. The switch element 302 can also be expressed as a drive element.

Figure 4:
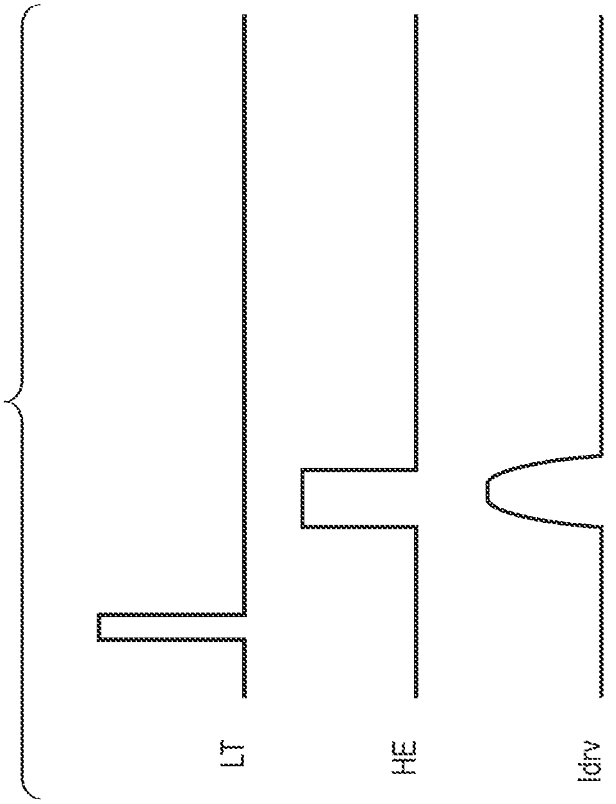
FIG. 4 is a timing chart showing an example of the drive mode of the electrothermal transducer.

FIG. 4 is a timing chart for explaining the drive mode of the above-described electrothermal transducer. The abscissa in FIG. 4 is the time base, and a latch signal LT and a heat enable signal HE which are control signals used to drive the electrothermal transducer and the current Idrv generated in the electrothermal transducer are plotted along the ordinate. The latch signal LT can be used as a trigger signal for starting drive control, and the heat enable signal HE can be used as a drive signal for deciding the drive period of the electrothermal transducer. Here, when the latch signal LT is input, the heat enable signal HE can be input.

In the example shown in FIG. 3, the heat enable signal HE is input based on the latch signal LT, and during the time when the heat enable signal HE is at high level (H level, which may be expressed as an activated level), the switch element 302 is in the conductive state, and the electrothermal transducer 301 is thus driven, and the current Idrv is generated. On the other hand, during the time when the heat enable signal HE is at low level (L level, which may be expressed as an inactivated level), the switch element 302 is in the nonconductive state, drive of the electrothermal transducer 301 is suppressed, and the current Idrv is not generated.

Figure 5:
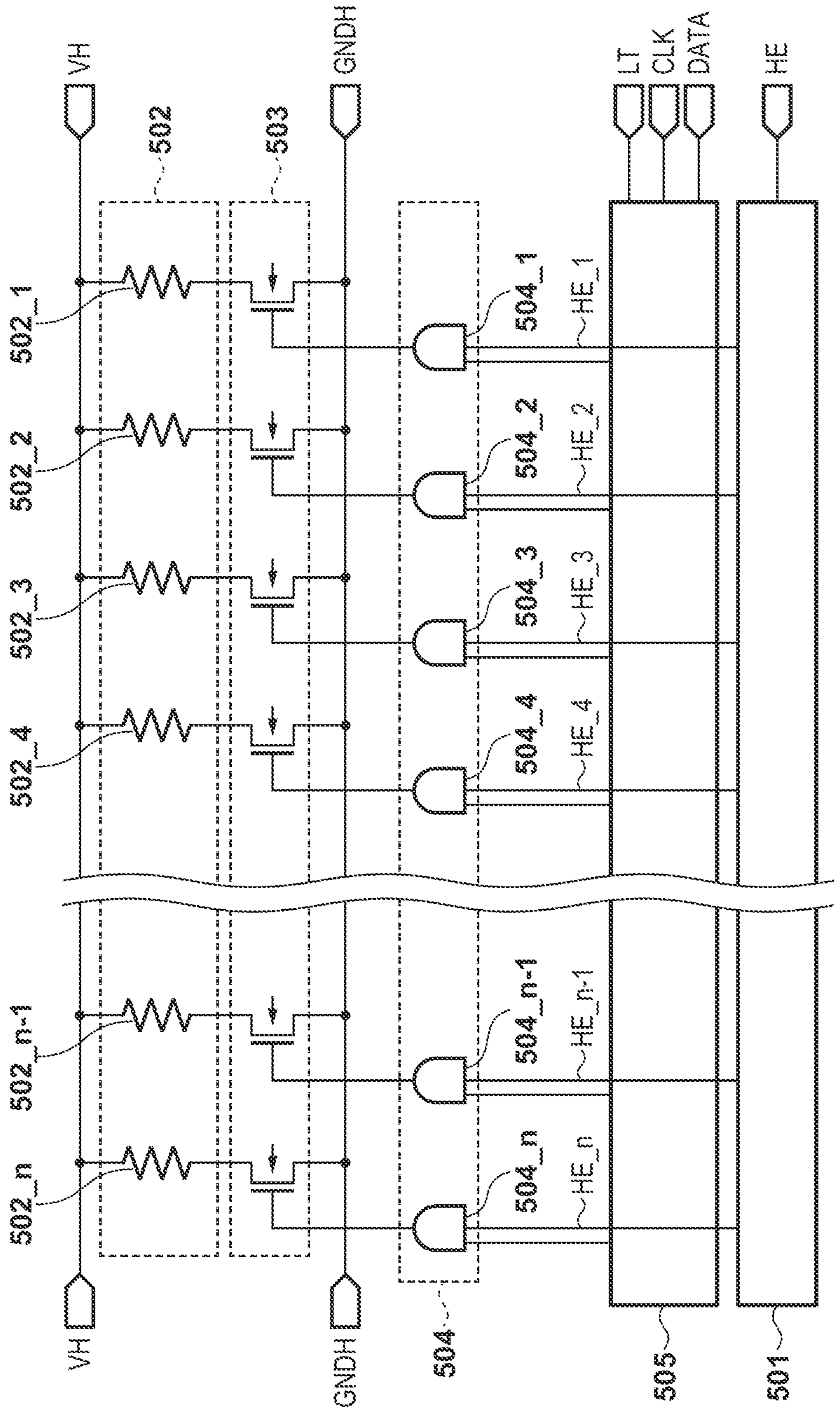
FIG. 5 is a view showing an example of the circuit configuration of a circuit board.

FIG. 5 is a view for explaining a part of the circuit configuration of the circuit board 11. The circuit board 11 includes a heater group 502, a drive element group 503, a logic gate group 504, a selective delay circuit 501, and a signal processing circuit 505.

The heater group 502 includes electrothermal transducers 502_1, 502_2, 502_3, . . . , 502_(*n*−1), and **502_*n* arrayed in one direction. These will sometimes be collectively expressed as the electrothermal transducer 502_1**, and the like (this also applies to other corresponding elements).

The drive element group 503 includes a plurality of switch elements 302 arrayed in correspondence with the plurality of electrothermal transducers 502_1, and the like.

The logic circuit group 504 includes a plurality of logic circuits arrayed in correspondence with the plurality of electrothermal transducers 502_1, and the like. An example of the logic circuit is an AND circuit, and it is assumed here that a plurality of AND circuits 504_1, 504_2, 504_3, . . . , 504_(*n*−1), and **504_*n*** are arrayed.

The selective delay circuit 501 can receive the heat enable signal HE and output it after delaying or without delaying, as will be described later in detail. For the sake of discrimination, the heat enable signals HE output to the AND circuits 504_1, and the like are expressed as heat enable signals HE_1, and the like, respectively.

Here, the signal processing circuit 505 includes a shift register and a latch circuit, and outputs a print signal based on the latch signal LT, a clock signal CLK, and a data signal DATA.

As an example, the AND circuit 504_1 receives the print signal based on the signals LT, CLK, and DATA from the signal processing circuit 505, receives the heat enable signal HE_1 from the selective delay circuit 501, and controls the corresponding switch element 302. For example, if the print signal is "1", during H level of the heat enable signal HE_1, the corresponding switch element 302 turns into the conductive state, and the electrothermal transducer 502_1 is driven. On the other hand, if the print signal is "0", independently of the heat enable signal HE_1, the corresponding switch element 302 turns into the nonconductive state, and drive of the electrothermal transducer 502_1 is suppressed.

Figure 6A:
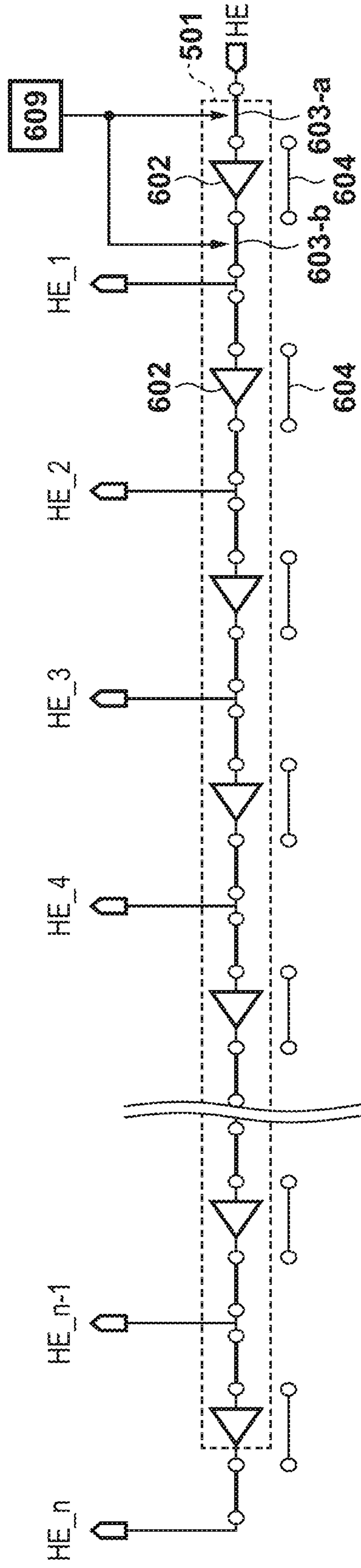
FIG. 6A is a view showing an example of the circuit configuration of a selective delay circuit.
Figure 6B:
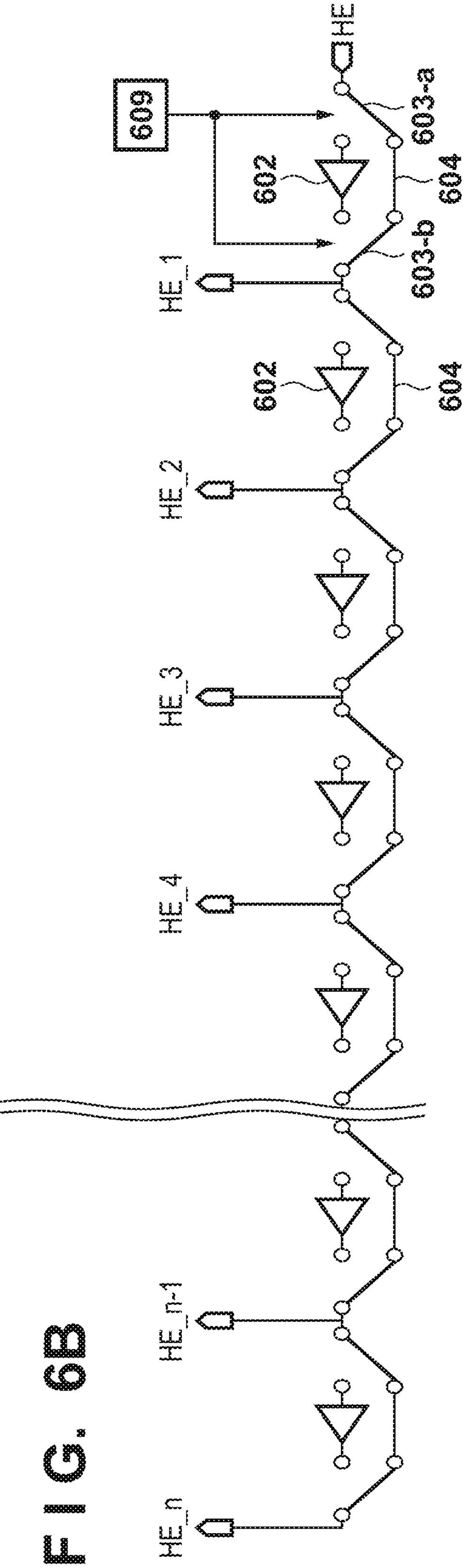
FIG. 6B is a view showing an example of the circuit configuration of a selective delay circuit.

FIGS. 6A and 6B are views showing the circuit configuration of the selective delay circuit 501. The selective delay circuit 501 functions as a signal generation unit that receives the heat enable signal HE and generates the plurality of heat enable signals HE_1, and the like based on the received heat enable signal HE_1. In this viewpoint, the plurality of heat enable signals HE_1, and the like can be considered as drive signals for actually driving the plurality of electrothermal transducers 502_1, and the like, and the heat enable signal HE can be considered as a reference signal for generating the heat enable signals HE_1, and the like.

In this example, the selective delay circuit 501 includes a plurality of delay circuits 602, a plurality of direct paths 604, and a plurality of switch elements 603*a* and 603*b* between a plurality of terminals configured to output the plurality of heat enable signals HE_1, and the like.

Each delay circuit 602 need only be configured to be able to delay an input signal and output it, and in this example, the delay circuit 602 is formed by a buffer circuit using an even number of inverter circuits. However, the present invention is not limited to this.

Each direct path 604 need only be configured to be able to substantially directly output an input signal, and in this example, the direct path 604 is formed by a mere signal line (typically, a wiring pattern made of a conductive material such as a metal) whose electrical resistance value is relatively low. However, the present invention is not limited to this. Hence, if the signal line is used as the direct path 604, a delay that may occur due to a parasitic resistance and a parasitic capacitance, which are associated with it, need only be suppressed as compared to a delay that the delay circuit 602 generates in the signal. The direct path 604 may be expressed as a through wire or the like.

The switch elements 603*a* and 603*b* are configured to select one of the delay circuit 602 and the direct path 604 based on a control signal from a control unit 609. The control unit 609 can control the switch elements 603*a* and 603*b* in accordance with an operation mode. Note that the control unit 609 may be a part of the selective delay circuit 501 or may be provided outside the selective delay circuit 501.

FIG. 6A shows a mode in which the switch elements 603*a* and 603*b* select the delay circuit 602, and FIG. 6B shows a mode in which the switch elements 603a and 603*b* select the direct path 604.

If the delay circuit 602 is selected (in the example shown in FIG. 6A), a delay is generated between the plurality of heat enable signals HE_1, and the like. For this reason, if the plurality of heat enable signals HE_1, and the like are output from the selective delay circuit 501, the plurality of electrothermal transducers 502_1, and the like are driven at timings different from each other, and the drive is started sequentially.

On the other hand, if the direct path 604 is selected (in the example shown in FIG. 6B), a delay is substantially not generated between the plurality of heat enable signals HE_1, and the like. For this reason, if the heat enable signals HE_1, and the like are output from the selective delay circuit 501, the plurality of electrothermal transducers 502_1, and the like are driven at timings equal to each other, and the drive is started substantially simultaneously.

In addition, the plurality of electrothermal transducers 502_1, and the like are driven during drive periods equal to each other. Hence, for example, if the delay circuit 602 is selected (in the example shown in FIG. 6A), the electrothermal transducers 502_1, and the like are driven during periods equal to each other, and the drive is sequentially ended.

In this way, the selective delay circuit 501 can be configured to include, as operation modes, a first mode (to be referred to as a shift timing mode hereinafter) in which the plurality of heat enable signals HE_1, and the like are generated by sequentially shifting the reference heat enable signal HE and a second mode (to be referred to as a simultaneous timing mode hereinafter) in which the plurality of heat enable signals HE_1, and the like are aligned to have the same timing as the reference heat enable signal HE. That is, in the shift timing mode, drive of the plurality of electrothermal transducers 502_1, and the like is sequentially started in accordance with the reference heat enable signal HE. To the contrary, in the simultaneous timing mode, the plurality of electrothermal transducers 502_1, and the like are driven as the same timing as the reference heat enable signal HE.

Figure 7A:
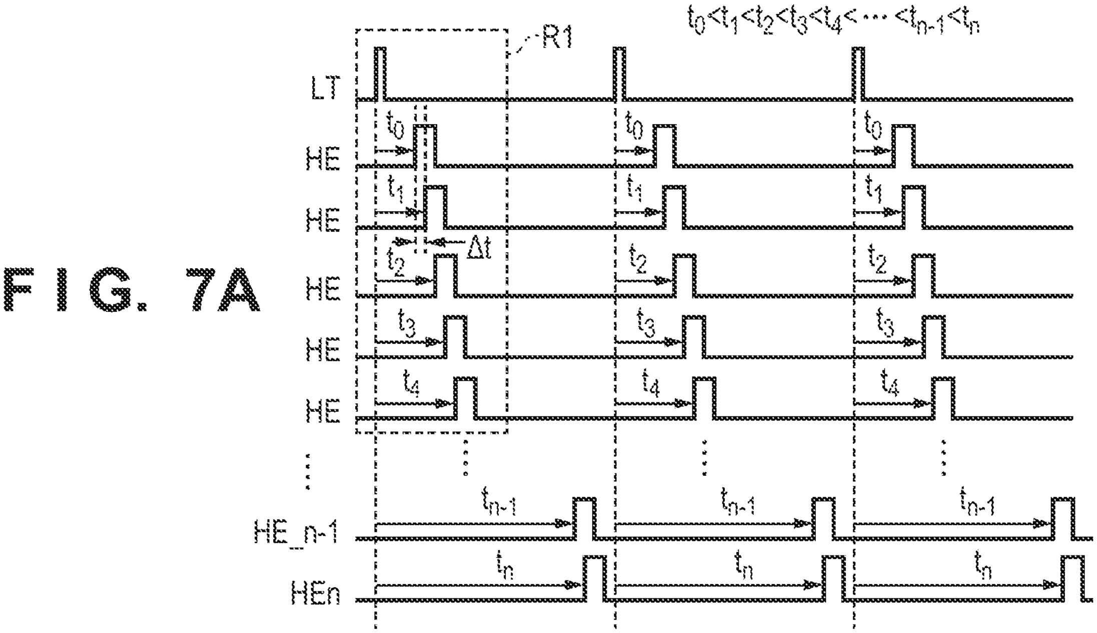
FIG. 7A is a timing chart showing an example of a signal waveform in the selective delay circuit.

FIG. 7A shows a timing chart concerning the signals LT and HE and the output signals HE_1 to HE_n of the selective delay circuit 501 in the shift timing mode (in the example shown in FIG. 6A). In this example, with respect to the input time of the latch signal LT as the reference, the heat enable signal HE is input after the elapse of time to, and the heat enable signal HE_1 is output with a delay time Δt from time to. Similarly, the subsequent heat enable signals HE_2 to HE_n are output with accumulation of the delay times Δt.

In this way, in the shift timing mode, the plurality of heat enable signals HE_1, and the like can be generated such that drive of the plurality of electrothermal transducers 502_1, and the like is sequentially started, the drive periods of these overlap each other, and drive of these is sequentially ended.

As for the shift timing mode, letting times $t_1$ to $t_n$ be the output timings of the heat enable signals HE_1 to HE_n with respect to the input time of the latch signal LT as the reference, $$\Delta t = t_K - t_{(K-1)}$$

$$t_K > t_{(K-1)}$$

can hold. Note that K is an arbitrary integer of 1 to n.

Figure 7B:
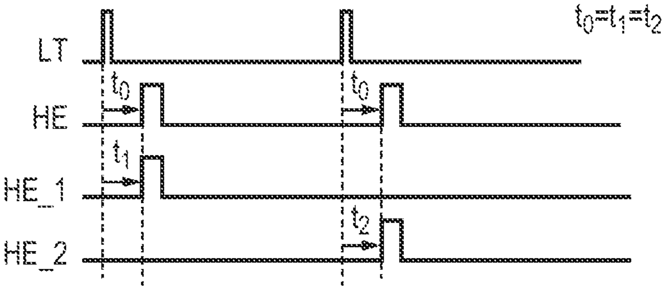
FIG. 7B is a timing chart showing an example of a signal waveform in the selective delay circuit.
Figure 7C:
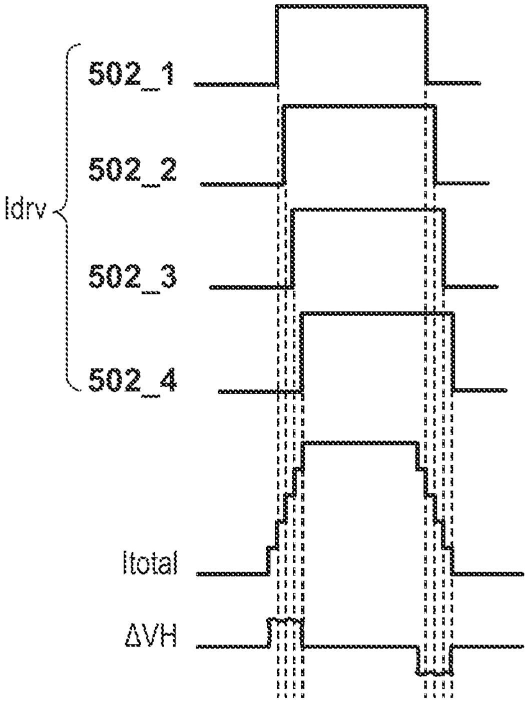
FIG. 7C is a timing chart showing an example of a signal waveform in the selective delay circuit.

Here, FIG. 7C is a timing chart for explaining the current Idrv, a total current amount Itotal of the power supply voltage VH, and a potential variation (noise) ΔVH of the power supply voltage VH associated with the total current amount Itotal concerning the plurality of electrothermal transducers 502_1, and the like corresponding to a region RI indicating one period of the latch signal LT (here, four currents Idrv are shown to make the chart easy to read).

In the shift timing mode, the plurality of electrothermal transducers 502_1, and the like are sequentially driven, and the drive timings of these are different from each other by the delay time Δt. Since the total current amount Itotal increases not at once but stepwise, the potential variation ΔVH can be reduced or suppressed. Hence, when executing printing by driving the plurality of electrothermal transducers 502_1, and the like, the shift timing mode is preferably used, and this makes it possible to reduce or suppress an electrical influence associated with the potential variation ΔVH on other circuit portions and implement high-quality printing.

FIG. 7B shows a timing chart concerning the signals LT and HE and the output signals HE_1 to HE_n of the selective delay circuit 501 in the simultaneous timing mode (in the example shown in FIG. 6B), like FIG. 7A. In this case, in one period of the latch signal LT, an arbitrary one (for example, HE_1) of the heat enable signals HE_1 to HE_n is output substantially at the same time as the heat enable signal HE without the delay time Δt. Similarly, in the next period, another one (for example, HE_2) of the heat enable signals HE_1 to HE_n is output substantially at the same time as the heat enable signal HE without the delay time Δt. This also applies to the remaining heat enable signals HE_3, and the like.

In this way, in the simultaneous timing mode, the plurality of heat enable signals HE_1, and the like can be generated such that the drive periods of the plurality of electrothermal transducers 502_1, and the like do not overlap each other.

The relationship of times $t_1$ to $t_n$ in the simultaneous timing mode can be expressed as $$t_K = t_{(K-1)}$$

The simultaneous timing mode can be used to detect heat (temperature change) when the electrothermal transducers 502_1, and the like are driven.

Figure 8:
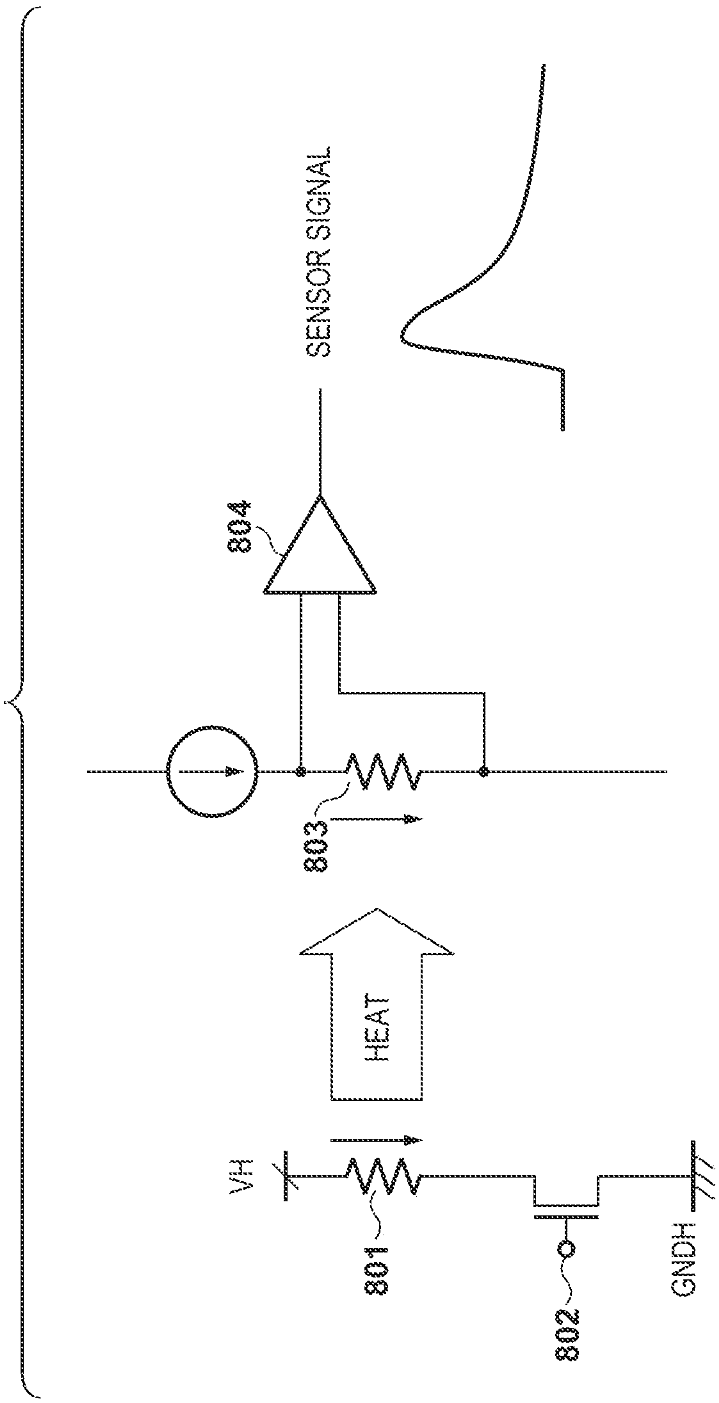
FIG. 8 is a view showing an example of a circuit configuration including an electrothermal transducer and a sensor element.

FIG. 8 shows the configuration of an element 800 including an electrothermal transducer 801 (an example of the electrothermal transducer 12), a switch element 802 for driving it, and a sensor element 803 (an example of the sensor element 19) arranged close to the electrothermal transducer 801.

The sensor element 803 is arranged to receive a constant current, and a potential difference that can vary depending on the heat (temperature change) of the electrothermal transducer 801 is generated in the sensor element 803. With this configuration, the sensor element 803 outputs the potential difference generated based on the constant current as a sensor signal to a signal amplifier 804.

When the electrothermal transducer 801 is driven, and the liquid is discharged, the temperature change of the electrothermal transducer 801 changes between a case where the mode of the discharge satisfies a criterion and a case where not, although a detailed description thereof will be omitted here. Hence, the potential difference generated in the sensor element 803 also changes. This potential difference is amplified as a sensor signal by the signal amplifier 804, processed by a signal processing unit of the subsequent stage, and this can implement evaluation or determination concerning whether the mode of the discharge satisfies the criterion.

It suffices that a known resistance element is used as the sensor element 803, and it is made of a material whose electrical resistance value varies relatively largely depending on the temperature change. The sensor element 803 may be expressed as a temperature detection element, or may be expressed as a discharge detection sensor or simply as a sensor.

Figure 9:
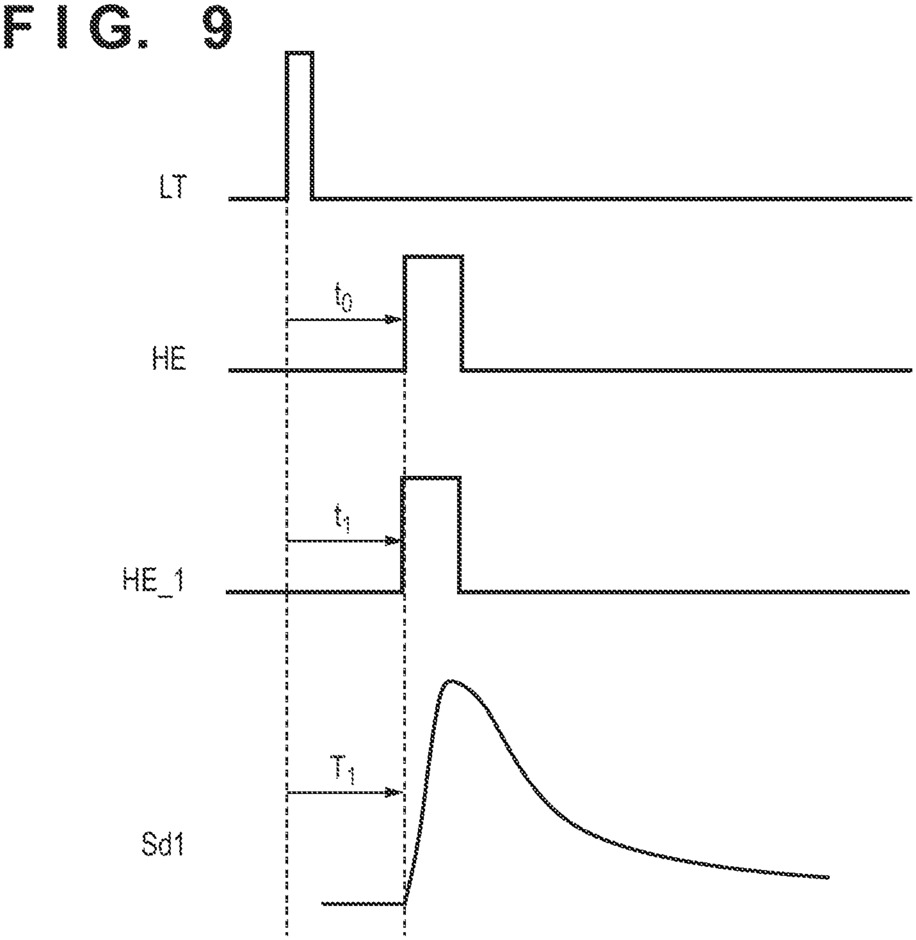
FIG. 9 is a timing chart showing an example of a signal waveform of the sensor element.

FIG. 9 is a timing chart for explaining the signal waveform of the sensor element 803 when the electrothermal transducer 801 is driven. Here, the electrothermal transducer 801 is driven based on the heat enable signal HE_1 generated in the simultaneous timing mode. That is, with respect to the input time of the latch signal LT as the reference, the heat enable signal HE is input after the elapse of time to, and the heat enable signal HE_1 can be output substantially at the same time as the heat enable signal HE (after the elapse of time $t_1$ (=$t_0$)). Accordingly, the potential difference of the sensor element 803 is read out as a signal Sd1, and the waveform exhibits a rising edge after the elapse of time $T_1$.

Figure 10:
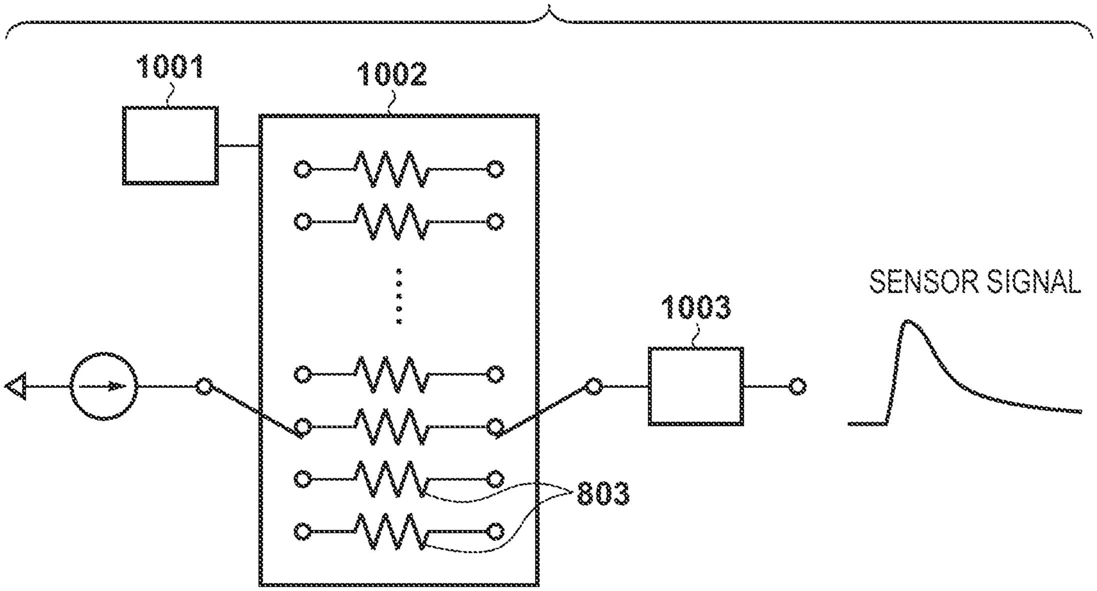
FIG. 10 is a view showing an example of a configuration capable of implementing evaluation concerning a liquid discharge mode.

FIG. 10 shows a configuration capable of implementing evaluation concerning a liquid discharge mode. The plurality of sensor elements 803 are arrayed in correspondence with the plurality of electrothermal transducers 801 to form a sensor group 1002. A selector 1001 selects one sensor element 803 from the sensor group 1002, and the potential difference of the selected sensor element 803 is input as a sensor signal to an evaluation circuit 1003. Based on the sensor signal of the selected sensor element 803, the evaluation circuit 1003 evaluates the liquid discharge mode associated with drive of the corresponding electrothermal transducer 801. The evaluation circuit 1003 can include the above-described signal amplifier 804.

Figure 11:
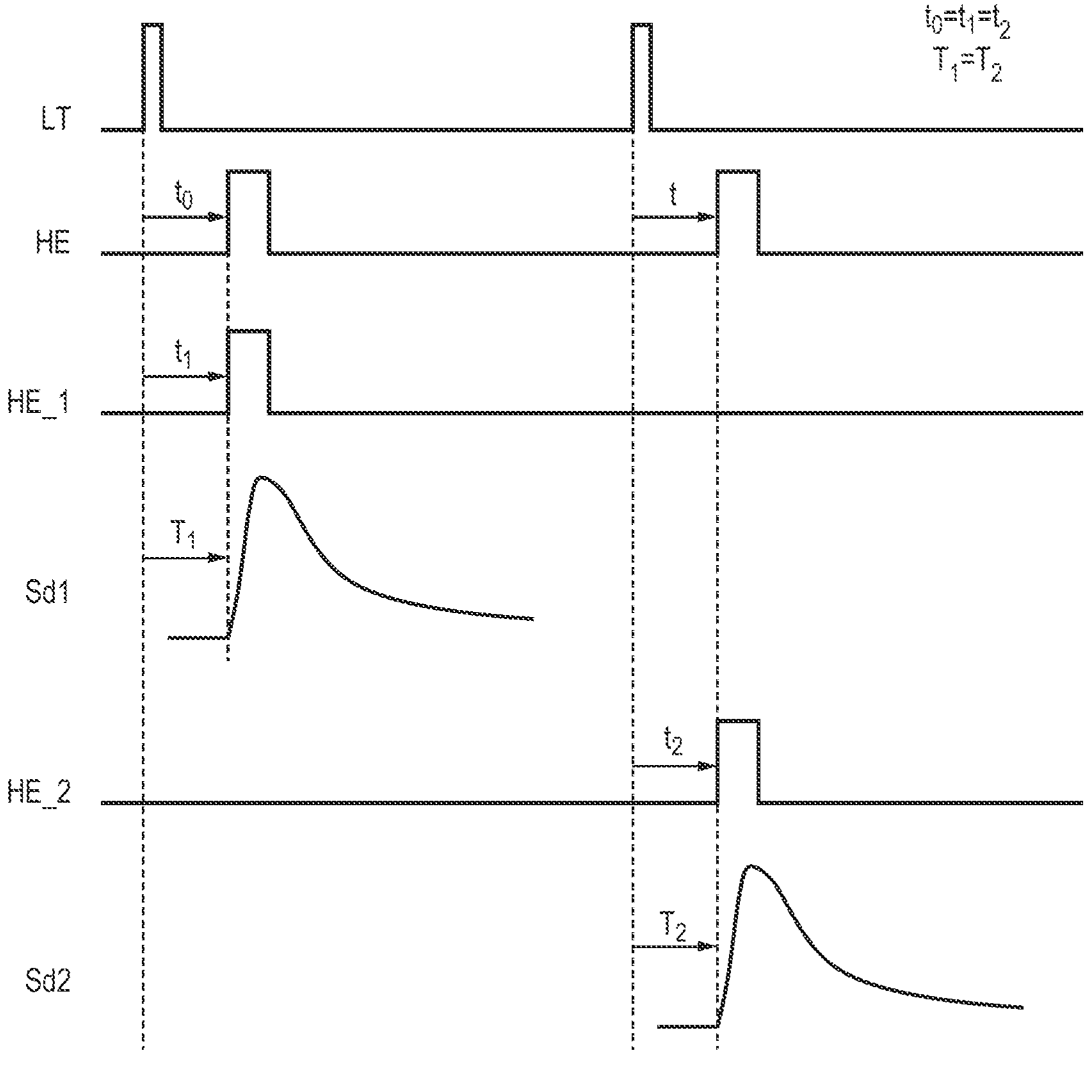
FIG. 11 is a timing chart showing an example of an evaluation mode.

FIG. 11 is a timing chart for explaining a mode of the above-described evaluation in a case where the sensor signal is sequentially read out from the plurality of sensor elements 803.

In one period of the latch signal LT, the heat enable signal HE_1 is output substantially at the same time as the heat enable signal HE without the delay time Δt. That is, elapsed times $t_0$ and $t_1$ with respect to the input time of the latch signal LT as the reference substantially equal each other. Then, based on the heat enable signal HE_1, the corresponding electrothermal transducer 801 is driven, and accordingly, the signal Sd1 is read out from the corresponding sensor element 803.

Similarly, in the next period, the heat enable signal HE_2 is output substantially at the same time as the heat enable signal HE without the delay time Δt. That is, elapsed times $t_0$ and $t_2$ with respect to the input time of the latch signal LT as the reference substantially equal each other. Then, based on the heat enable signal HE_2, the corresponding electrothermal transducer 801 is driven, and accordingly, a signal Sd2 is read out from the corresponding sensor element 803.

For the plurality of thus readout sensor signals Sd1 and Sd2, the elapsed times $T_1$ and $T_2$ in which the waveforms exhibit a rising edge equal each other in the simultaneous timing mode. Note that although FIG. 11 shows the sensor signals Sd1 and Sd2, the same applies to other subsequent sensor signals Sd3, Sd4, . . . , SdN, and elapsed times $T_3$, $T_4$, . . . , $T_N$ in which the waveforms exhibit a rising edge equal the times $T_1$ and $T_2$.

That is, in the simultaneous timing mode, the relationship between the elapsed times $T_1$ to $T_n$ in which the plurality of sensor signals read out from the plurality of sensor elements 803 exhibit a rising edge can be expressed as $$T_K = T_{(K-1)}$$

In this way, according to the simultaneous timing mode, all the plurality of sensor signals read out from the plurality of sensor elements 803 can be evaluated without considering the delay time Δt. Hence, evaluation of the liquid discharge mode can relatively easily be implemented for all the plurality of electrothermal transducers 801.

As described above, according to this embodiment, in the print mode in which printing is executed by driving the plurality of electrothermal transducers, the shift timing mode is used, and the drive timings of the electrothermal transducers can be made different from each other by the delay time Δt. This makes it possible to reduce or suppress the potential variation ΔVH and an electrical influence associated with this on other circuit portions and implement high-quality printing.

On the other hand, in the evaluation mode in which the temperature change of each electrothermal transducer is detected by the sensor element, and the liquid discharge mode is evaluated, the simultaneous timing mode is used, and the delay time Δt is not generated between the plurality of sensor signals used for the evaluation. This makes it possible to implement the evaluation of the liquid discharge mode relatively easily and without considering the delay time Δt.

Hence, according to this embodiment, the heat enable signals HE_1, and the like appropriate for each of the print mode and the evaluation mode can be generated in accordance with the application purpose, and this can be advantageous in diversifying drive control of the liquid discharge apparatus 1.

(Application Example)

The plurality of electrothermal transducers can be driven by, for example, a time-division driving method, aiming at the above-described suppression of the potential variation ΔVH, which is one of the purposes. For example, the plurality of electrothermal transducers are divided into several groups each including two or more electrothermal transducers, and the two or more electrothermal transducers in each group are substantially simultaneously driven sequentially on a block basis. Such a group can also be expressed as a time division group, and of the electrothermal transducers of the groups different from each other, electrothermal transducers to be substantially simultaneously driven can also be expressed as a time division block.

For example, letting g be the number of groups, and b be the number of blocks, the total number of electrothermal transducers is g×b (g and b are arbitrary integers). In this configuration, in the example shown in FIG. 5, the electrothermal transducers 502_1 in groups G1 to Gg are driven, and the electrothermal transducers 502_2 in the groups G1 to Gg are then driven. From then on, similarly, the electrothermal transducers 502_3 to **502_*b* in the groups G1** to Gg are sequentially driven.

The shift timing mode and the simultaneous timing mode described in the embodiment can also be applied to a case where the plurality of electrothermal transducers are driven by the time-division driving method. Note that the contents of the embodiment can be applied not only to this example but also to a variety of drive modes without departing from the spirit of the present invention.

(Modification)

The application purposes of the shift timing mode and the simultaneous timing mode described in the embodiment are not limited to the print mode and the evaluation mode, and these modes can also be applied to another application purpose. For example, an inkjet printer that is the liquid discharge apparatus 1 includes a high-quality print mode and a high-speed print mode, the shift timing mode can be applied to the high-quality print mode, and the simultaneous timing mode can be applied to the high-speed print mode. Alternatively, the inkjet printer includes a recovery processing mode for eliminating ink clogging or the like, in addition to the print mode, the shift timing mode and the simultaneous timing mode can selectively be applied to the print mode, and the simultaneous timing mode can be applied to the recovery processing mode. In some or all of these cases, in the simultaneous timing mode, the plurality of heat enable signals HE_1, and the like may be output from the selective delay circuit 501 at once.

(Other Embodiments)

In the embodiment, each element is named using an expression based on its main function. However, each function described in the embodiment may be an auxiliary function, and the expression is not strictly limited. Also, the expression can be replaced with a similar expression. In the same vein, an expression "unit, portion" can be replaced with "tool", "component", "member", "structure", "assembly", or the like. Alternatively, these may be omitted or attached.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-001910, filed on Jan. 10, 2023, which is hereby incorporated by reference herein in its entirety.

What is claimed is:

1. A head board comprising:

at least one orifice configured to discharge a liquid;

a plurality of electrothermal transducers configured to generate heat to discharge the liquid from the at least one orifice;

a sensor element configured to detect a state of discharge of the liquid from the at least one orifice; and a delay circuit configured to delay an output timing of a signal, wherein the plurality of electrothermal transducers and the sensor element are driven by a common drive signal, when driving the plurality of electrothermal transducers, the drive signal is input to the plurality of electrothermal transducers via the delay circuit, and when driving the sensor element, the drive signal is input to the sensor element without passing through the delay circuit.

2. The board according to claim 1, further comprising a signal generation unit configured to generate the drive signal based on a reference signal, wherein the signal generation unit includes, as operation modes:

a first mode in which a plurality of drive signals are generated based on the reference signal such that drive of the plurality of electrothermal transducers is sequentially started, and a second mode in which the plurality of drive signals are generated to have the same timing as the reference signal.

3. The board according to claim 2, wherein the signal generation unit includes:

a plurality of delay circuits;

a plurality of switch elements arranged in correspondence with the plurality of delay circuits; and a control unit configured to control the plurality of switch elements, wherein the control unit controls the plurality of switch elements such that:

in the first mode, a first electrical path in which the plurality of delay circuits are directly connected is formed, and in the second mode, a second electrical path without interposing the plurality of delay circuits is formed.

4. The board according to claim 3, wherein each of the plurality of delay circuits is a buffer circuit.

5. The board according to claim 3, further comprising:

a plurality of sensor elements; and an evaluation circuit configured to evaluate, based on signals of the plurality of sensor elements, a discharge mode of the liquid based on drive of the plurality of electrothermal transducers, wherein when the evaluation circuit executes the evaluation, the control unit generates the plurality of drive signals in the second mode.

6. The board according to claim 5, wherein each of the plurality of sensor elements is a resistance element capable of receiving a constant current, and the evaluation circuit receives a potential difference generated in each sensor element based on the constant current and performs the evaluation.

7. The board according to claim 2, further comprising a plurality of drive elements provided in correspondence with the plurality of electrothermal transducers, wherein the plurality of drive elements receive the plurality of drive signals from the signal generation unit and drive corresponding electrothermal transducers.

8. The board according to claim 2, wherein in the first mode, the signal generation unit generates the plurality of drive signals such that drive periods of the plurality of electrothermal transducers overlap each other, and drive of the plurality of electrothermal transducers is sequentially ended, and in the second mode, the signal generation unit generates the plurality of drive signals such that the drive periods of the plurality of electrothermal transducers do not overlap each other.

9. The board according to claim 8, wherein in both the first mode and the second mode, the signal generation unit generates the plurality of drive signals such that the drive periods of the plurality of electrothermal transducers equal each other.

10. A liquid discharge head comprising:

the head board according to claim 1; and a plurality of liquid orifices provided in correspondence with the plurality of electrothermal transducers.

11. A liquid discharge apparatus comprising:

the liquid discharge head according to claim 10; and a processor configured to perform drive control of the liquid discharge head.

* * * * *